(12) United States Patent
Khiat

(10) Patent No.: US 10,665,103 B2
(45) Date of Patent: May 26, 2020

(54) VEHICLE PERIPHERY INFORMATION VERIFICATION DEVICE AND METHOD

(71) Applicant: Nissan Motor Co., Ltd., Yokohama-shi, Kanagawa (JP)

(72) Inventor: Abdelaziz Khiat, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/565,788

(22) PCT Filed: Apr. 13, 2015

(86) PCT No.: PCT/JP2015/061336
§ 371 (c)(1),
(2) Date: Oct. 11, 2017

(87) PCT Pub. No.: WO2016/166790
PCT Pub. Date: Oct. 20, 2016

(65) Prior Publication Data
US 2018/0122238 A1    May 3, 2018

(51) Int. Cl.
| | | |
|---|---|---|
| G08G 1/16 | (2006.01) | |
| G01C 21/34 | (2006.01) | |
| G01C 21/36 | (2006.01) | |

(52) U.S. Cl.
CPC .......... *G08G 1/16* (2013.01); *G01C 21/3415* (2013.01); *G01C 21/3461* (2013.01); *G01C 21/3667* (2013.01); *G08G 1/165* (2013.01); *G08G 1/166* (2013.01)

(58) Field of Classification Search
CPC .......... G01C 21/3415; G01C 21/3461; G01C 21/3667; G08G 1/166

USPC .......................................................... 701/411
See application file for complete search history.

(56) References Cited

U.S. PATENT DOCUMENTS

| | | | | |
|---|---|---|---|---|
| 8,849,494 | B1* | 9/2014 | Herbach | B60W 30/00 701/24 |
| 8,855,849 | B1* | 10/2014 | Ferguson | G05D 1/00 701/28 |
| 9,097,800 | B1* | 8/2015 | Zhu | G01S 13/865 |
| 2005/0225457 | A1 | 10/2005 | Kagawa | |
| 2008/0266168 | A1 | 10/2008 | Aso et al. | |

(Continued)

FOREIGN PATENT DOCUMENTS

| | | |
|---|---|---|
| EP | 1750146 A2 | 2/2007 |
| JP | 2003157489 A | 5/2003 |

(Continued)

*Primary Examiner* — Maceeh Anwari
(74) *Attorney, Agent, or Firm* — Young Basile Hanlon & MacFarlane, P.C.

(57) ABSTRACT

A vehicle periphery information verification device comprises: an obstacle detecting unit configured to detect an obstacle; an arranging unit configured to arrange a travelable region in which a vehicle is travelable and the detected obstacle on a map; an action determining unit configured to determine an action of a host vehicle by using information on the arranged obstacle; a judging unit configured to judge whether the arranged obstacle is arranged in the travelable region; and a prohibiting unit configured to prohibit the action determining unit from determining the action of the host vehicle when the obstacle is determined to be not arranged in the travelable region.

12 Claims, 7 Drawing Sheets

(56) References Cited

U.S. PATENT DOCUMENTS

2010/0030426 A1* 2/2010 Okita ................. B60T 7/22
  701/41
2012/0283895 A1 11/2012 Noda

FOREIGN PATENT DOCUMENTS

| JP | 2005301581 A |   | 10/2005 |
| JP | 2007233764 A |   | 9/2007  |
| JP | 2010026618 A | * | 2/2010  |
| JP | 2012038138 A |   | 2/2012  |
| JP | 2013242615 A |   | 12/2013 |

* cited by examiner

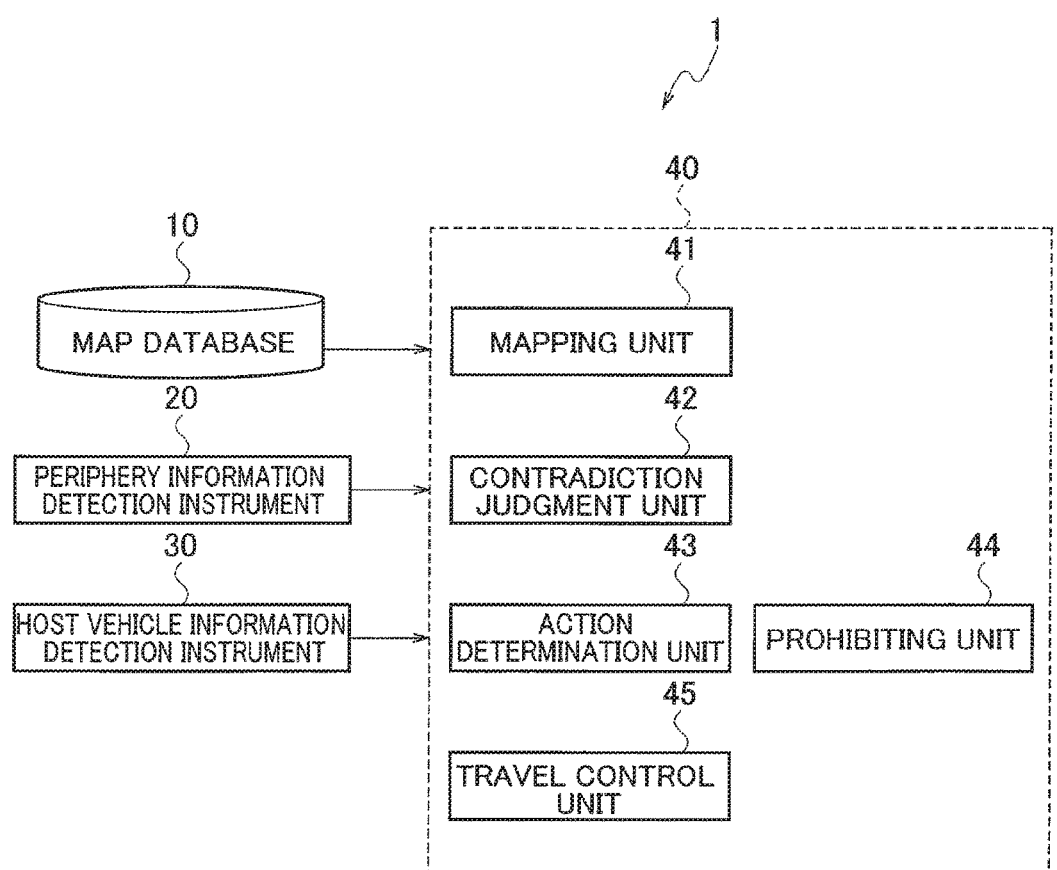

VEHICLE PERIPHERY INFORMATION VERIFICATION DEVICE AND METHOD

TECHNICAL FIELD

The present invention relates to vehicle periphery information verification device and method which are applied to a vehicle having an autonomous driving function.

BACKGROUND

A technique of symbolizing a driving scene of a host vehicle based on a traveling condition of the host vehicle and information on obstacles in the periphery of the host vehicle is conventionally known (Japanese Patent Application Publication No. 2013-242615). In Japanese Patent Application Publication No. 2013-242615, transition of the symbolized drive scene is predicted to determine driving operations.

When the technique of Japanese Patent Application Publication No. 2013-242615 is applied to autonomous driving, the symbolized drive scene greatly differs from the actual drive scene and highly-accurate autonomous driving may be thus difficult to perform.

SUMMARY

The present invention has been made in view of the aforementioned problem and an object thereof is to provide vehicle periphery information verification device and method which can achieve highly-accurate autonomous driving by arranging an obstacle on a map to obtain a drive scene close to an actual one and by detecting a contradiction which may occur when the obstacle is arranged on the map.

A vehicle periphery information verification device according to an embodiment of the present invention detects an obstacle existing in the periphery of a host vehicle, arranges a travelable region in which a vehicle is travelable and the detected obstacle on a map, determines an action of a host vehicle by using information on the arranged obstacle, judges whether the arranged obstacle is arranged in the travelable region, prohibits itself from determining the action of the host vehicle by using the information on the obstacle when the obstacle is determined to be not arranged in the travelable region.

BRIEF DESCRIPTION OF THE DRAWINGS

FIG. 1 is a configuration diagram of a vehicle periphery information verification device according to an embodiment of the present invention;

FIG. 3B is an enlarged view of a portion surrounded by a dotted line in FIG. 3A;

DETAILED DESCRIPTION OF THE EMBODIMENTS

Figure 2A:
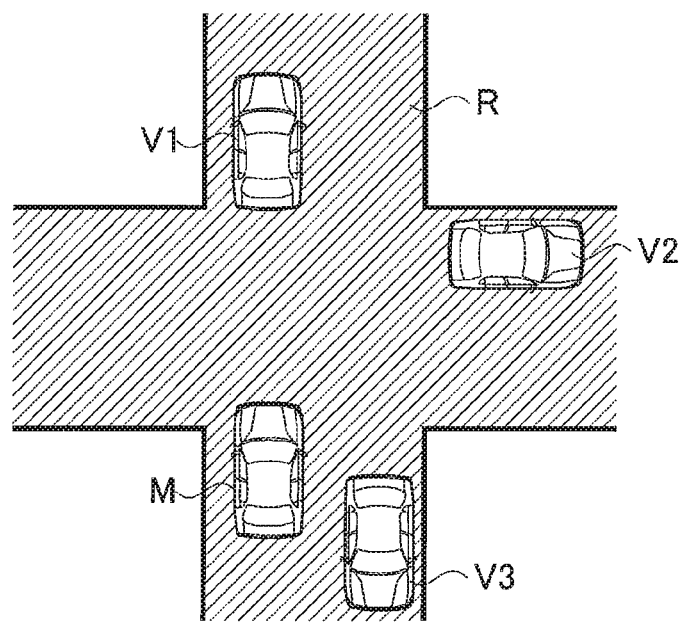
FIGS. 2A and 2B are views in which a travelable region and vehicles are arranged on a map.

An embodiment of the present invention is described below with reference to the drawings. The same parts in the description of the drawings are denoted by the same reference numerals and explanation thereof is omitted.

A configuration of a vehicle periphery information verification device 1 according to the embodiment of the present invention is described with reference to FIG. 1. As illustrated in FIG. 1, the vehicle periphery information verification device 1 includes, a periphery information detection instrument 20 (obstacle detecting unit), a host vehicle information detection instrument 30, a controller 40, and a map database 10 in which map information such as road information and facility information is stored.

The periphery information detection instrument 20 is an instrument which obtains information on obstacles in the periphery of a host vehicle and is, for example, a camera, a laser radar, and the like. The periphery information detection instrument 20 detects objects existing in the periphery of the host vehicle such as other vehicles, motorcycles, bicycles, and pedestrians and detects distances from the host vehicle, relative angles, relative speeds, and the like. Then, the periphery information detection instrument 20 outputs the detected information (hereafter, simply referred to as detected periphery information) to the controller 40.

The host vehicle information detection instrument 30 is an instrument which detects information on the host vehicle and is, for example, a vehicle speed sensor, a steering angle sensor, a GPS receiver, and the like. The host vehicle information detection instrument 30 outputs detected speed, steering angle, and position information of the host vehicle to the controller 40.

The controller 40 performs autonomous control of travel of the host vehicle by using the information of the map database 10, the periphery information detection instrument 20, and the host vehicle information detection instrument 30. Specifically, the controller 40 judges a travel route to a destination by using the information of the map database 10. Next, the controller 40 controls various actuators by using the information of the periphery information detection instrument 20 and the host vehicle information detection instrument 30 and causes the host vehicle to autonomously travel along the judged travel route. Note that the map database 10 may be stored in a car navigation device mounted in the vehicle or a server. When the map database 10 is stored in the server, the controller 40 can obtain the map information from time to time by means of communication.

The controller 40 can be divided into a mapping unit 41, a contradiction judgment unit 42, an action determination unit 43, a prohibiting unit 44, and a travel control unit 45 when considered in terms of function.

The mapping unit 41 (arranging unit) sets a travelable region R to be described later on the map and arranges obstacles detected by the periphery information detection instrument 20 on the map.

The contradiction judgment unit 42 (judging unit) judges whether there is a contradiction between the travelable region R set by the mapping unit 41 and the arranged obstacles. The contradiction judgment unit 42 outputs the judgement result to the action determination unit 43.

The action determination unit 43 (action determining unit) determines an action of autonomous driving based on the judgement result of the contradiction judgment unit 42 and outputs the determination result to the travel control unit 45.

The prohibiting unit 44 (prohibiting unit) prohibits the action determination unit 43 from determining the action of autonomous driving based on the judgement result of the contradiction judgment unit 42.

The travel control unit 45 controls the various actuators based on the determination of the action determination unit 43 and performs the autonomous control of travel of the host vehicle.

Note that the controller 40 is, for example, a computer including a CPU, a ROM, a RAM, a data bus connecting these units, and an input-output interface, and the CPU performs predetermined processing according to a program stored in the ROM.

A specific operation example of the vehicle periphery information verification device 1 having the aforementioned configuration is described with reference to FIGS. 2A and 2B.

As illustrated in FIG. 2A, the mapping unit 41 sets the travelable region R on the map by using the position information of the host vehicle M and the map database 10. The travelable region R is a region in which the vehicle can physically travel and is, for example, a region including a roadway and shoulders. Then, the mapping unit 41 arranges other vehicles V1 to V3 on the map by using the position information on the other vehicles V1 to V3 obtained from the periphery information detection instrument 20. A drive scene close to an actual one can be obtained by performing the mapping as described above.

When a failure occurs in the periphery information detection instrument 20 or fog occurs around the vehicle, detection accuracy of the periphery information detection instrument 20 may decrease. If information with poor detection accuracy is used, for example, as illustrated in FIG. 2B, there is a possibility that part of the other vehicle V1 is arranged to overlap a region outside the travelable region R or the entire vehicle is arranged outside the travelable region R like the other vehicle V2.

Figure 2B:
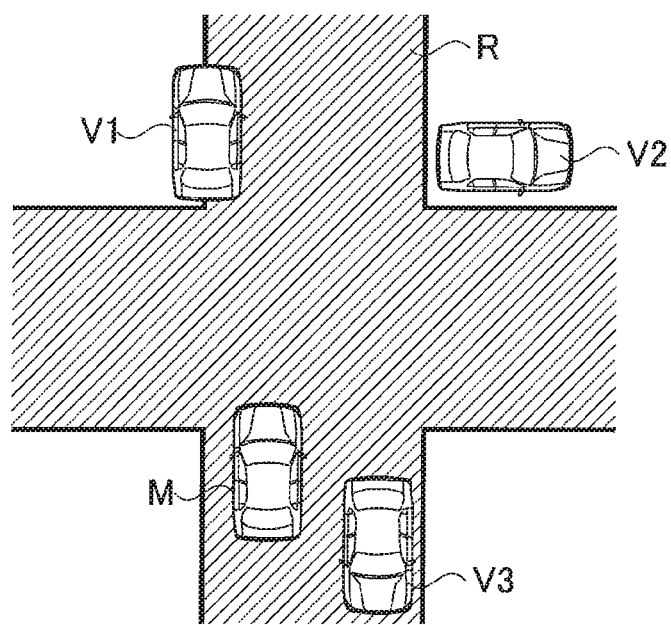

When the arranging result illustrated in FIG. 2B is obtained, the information on the other vehicles V1, V2 may be information including errors, and performing autonomous driving by using such information may lead to autonomous driving with poor accuracy. Thus, in such a case, the contradiction judgment unit 42 judges that the detected periphery information includes a contradiction, and outputs the judgement result to the action determination unit 43 and the prohibiting unit 44. When the contradiction judgment unit 42 judges that the detected periphery information includes a contradiction, the prohibiting unit 44 outputs a command to the action determination unit 43 and prohibits the action determination unit 43 from determining the action of autonomous driving by using the detected periphery information. In other words, the action determination unit 43 determines the action of the autonomous driving without using the detected periphery information, based on the command of the prohibiting unit 44. Note that, when the prohibiting unit 44 prohibits the action determination unit 43 from determining the action of autonomous driving by using the detected periphery information, for example, the action determination unit 43 may determine to take an action of maintaining the traveling state before the prohibiting by the prohibiting unit 44 or may stop the vehicle at a safe place by using previously-stored information. Moreover, the controller 40 may notify the driver that the detected periphery information includes a contradiction through voice guidance or the like and urge the driver to switch from autonomous driving to manual driving.

Meanwhile, when the other vehicles V1 to V3 are arranged in the travelable region R as illustrated in FIG. 2A, the contradiction judgment unit 42 judges that the detected periphery information includes no contradiction and outputs the judgement result to the action determination unit 43 and the prohibiting unit 44. In this case, since the detected periphery information includes no contradiction, the action determination unit 43 determines the action of autonomous driving by using the detected periphery information.

Figure 3A:
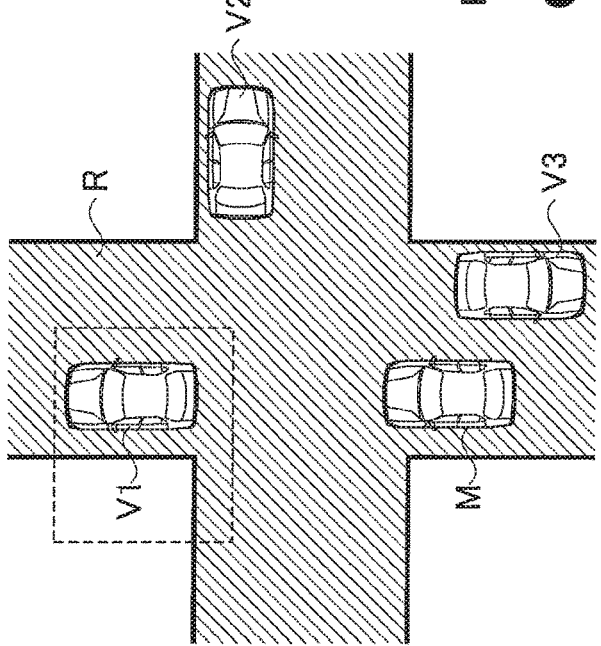
FIGS. 3A-3C are views for explaining a method of judging whether an obstacle overlaps the region outside the travelable region.
Figure 3B:
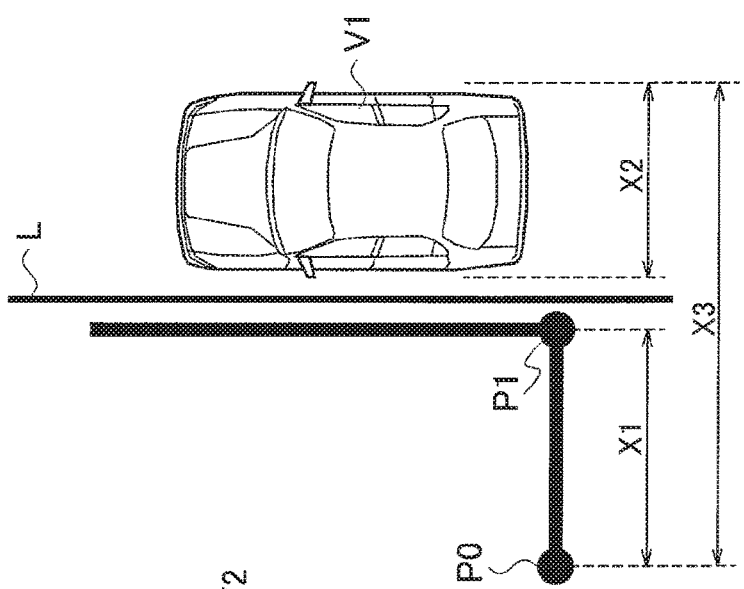
Figure 3C:
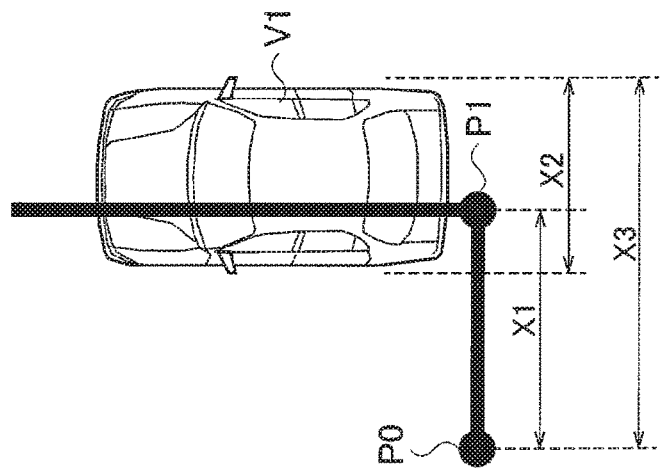

Next, a method of judging whether the other vehicles V1 to V3 are arranged in the travelable region R is described with reference to FIGS. 3A-3C. As illustrated in FIG. 3B which is an enlarged view of a dotted line portion in FIG. 3A, the contradiction judgment unit 42 sets a first end point P0 and a second end point P1 on a boundary line of the travelable region R by using the detected periphery information. In this case, the distance from the first end point P0 to the second end point P1 is referred to as $x1$. Moreover, the contradiction judgment unit 42 obtains the vehicle width (the length is referred to as $x2$) of the other vehicle V1 from the detected periphery information. Furthermore, the distance from the end point P0 including the vehicle width of the other vehicle V1 is referred to as $x3$.

The contradiction judgment unit 42 judges that the other vehicle V1 is arranged in the travelable region R when $x3>x2+x1$. In other words, the contradiction judgment unit 42 judges whether a separation line L which does not overlap the other vehicle V1 can be drawn between the other vehicle V1 and the travelable region R and, when the separation line L can be drawn, judges that the other vehicle V1 is arranged in the travelable region R. Meanwhile, as illustrated in FIG. 3C, when $x3 \leq x2+x1$, the contradiction judgment unit 42 judges that the other vehicle V1 is not arranged in the travelable region R.

Next, an operation example of the vehicle periphery information verification device 1 is described with reference to the flowchart of FIG. 4.

In step S101, the periphery information detection instrument 20 detects obstacles existing in the periphery of the host vehicle M. When detecting multiple obstacles, for example, detecting three other vehicles as illustrated in FIG. 2A, the periphery information detection instrument 20 sets names V1, V2, V3 for the detected other vehicles, respectively. When the periphery information detection instrument 20 detects n other vehicles, the name of the n-th vehicle is Vn. In the subsequent steps, description is given assuming that three other vehicles (n=3) are detected.

In step S102, the mapping unit 41 sets the travelable region R on the map by using the position information of the host vehicle M and the map database 10.

In step S103, the mapping unit 41 arranges the other vehicles V1 to V3 detected in step S101 in the travelable region R.

In step S104, the contradiction judgment unit 42 sets a variable i to 1 to judge whether each of the other vehicles V1 to V3 overlaps the region outside the travelable region R, in step S105 and beyond. When the variable i is set to 1, the other vehicle V1 is the target of the judgement.

In step S105, the contradiction judgment unit 42 judges whether the other vehicle V1 overlaps the region outside the travelable region R. When the other vehicle V1 does not overlap the region outside the travelable region R (No in step S105), the processing proceeds to step S106. Meanwhile, when the other vehicle V1 overlaps the region outside the travelable region R (Yes in step S105), the processing proceeds to step S109.

In step S106, the contradiction judgment unit 42 sets the variable i to i+1. The other vehicle V2 thereby becomes the next target of the judgement.

In step S107, the contradiction judgment unit 42 judges whether i≥n. When i≥n (Yes in step S107), the processing proceeds to step S108. Meanwhile, when i<n (No in step S107), the processing returns to step S105. By repeating the processing of steps S105 to S107, the contradiction judgment unit 42 judges whether at least one other vehicle overlapping the region outside the travelable region R exists. Specifically, when the other vehicle overlapping the region outside the travelable region R does not exist at all, the contradiction judgment unit 42 judges that the other vehicles (V1 to V3) are all arranged in the travelable region R.

In step S108, since the other vehicles (V1 to V3) are all arranged in the travelable region R, the action determination unit 43 determines the action of the autonomous driving by using the detected periphery information.

Meanwhile, in step S109, when at least one of the obstacles detected in step S101 overlaps the region outside the travelable region R, the prohibiting unit 44 prohibits the action determination unit 43 from determining the action of autonomous driving by using the detected periphery information. The action determination unit 43 thereby determines the action of autonomous driving without using the detected periphery information.

In step S110, the travel control unit 45 performs the autonomous control of travel of the host vehicle M by controlling the various actuators based on the determination made in step S108 or step S109.

As described above, in the vehicle periphery information verification device 1 according to the embodiment, the following operations and effects can be obtained.

The vehicle periphery information verification device 1 arranges the detected obstacles in the travelable region R and judges whether each obstacle overlaps the region outside the travelable region R. Then, when judging that any of the obstacles overlaps the region outside the travelable region R, the vehicle periphery information verification device 1 prohibits itself from determining the action of autonomous driving by using the detected periphery information, determines the action of autonomous driving without using the detected periphery information, and performs the autonomous control of the travel of the host vehicle M based on this determination. This prevents the vehicle periphery information verification device 1 from using the detected periphery information including a contradiction, and safe and highly-accurate autonomous driving can be thereby achieved. Moreover, when the detected obstacles are all arranged in the travelable region R, the vehicle periphery information verification device 1 determines the action of autonomous driving by using the detected periphery information and performs the autonomous control of travel of the host vehicle based on this determination.

Moreover, when at least part of the obstacle overlaps the region outside the travelable region R as illustrated in FIG. 2B, the vehicle periphery information verification device 1 determines the action of autonomous driving without using the detected periphery information. The detected periphery information including any contradiction is thereby not used and the vehicle periphery information verification device 1 can thus achieve safer autonomous driving.

Furthermore, the vehicle periphery information verification device 1 judges whether the separation line L not overlapping the obstacle can be drawn between the obstacle and the travelable region R to judge whether the obstacle is arranged in the travelable region R. The vehicle periphery information verification device 1 can thereby accurately judge whether the obstacle is arranged in the travelable region R.

MODIFIED EXAMPLE 1

Figure 5:
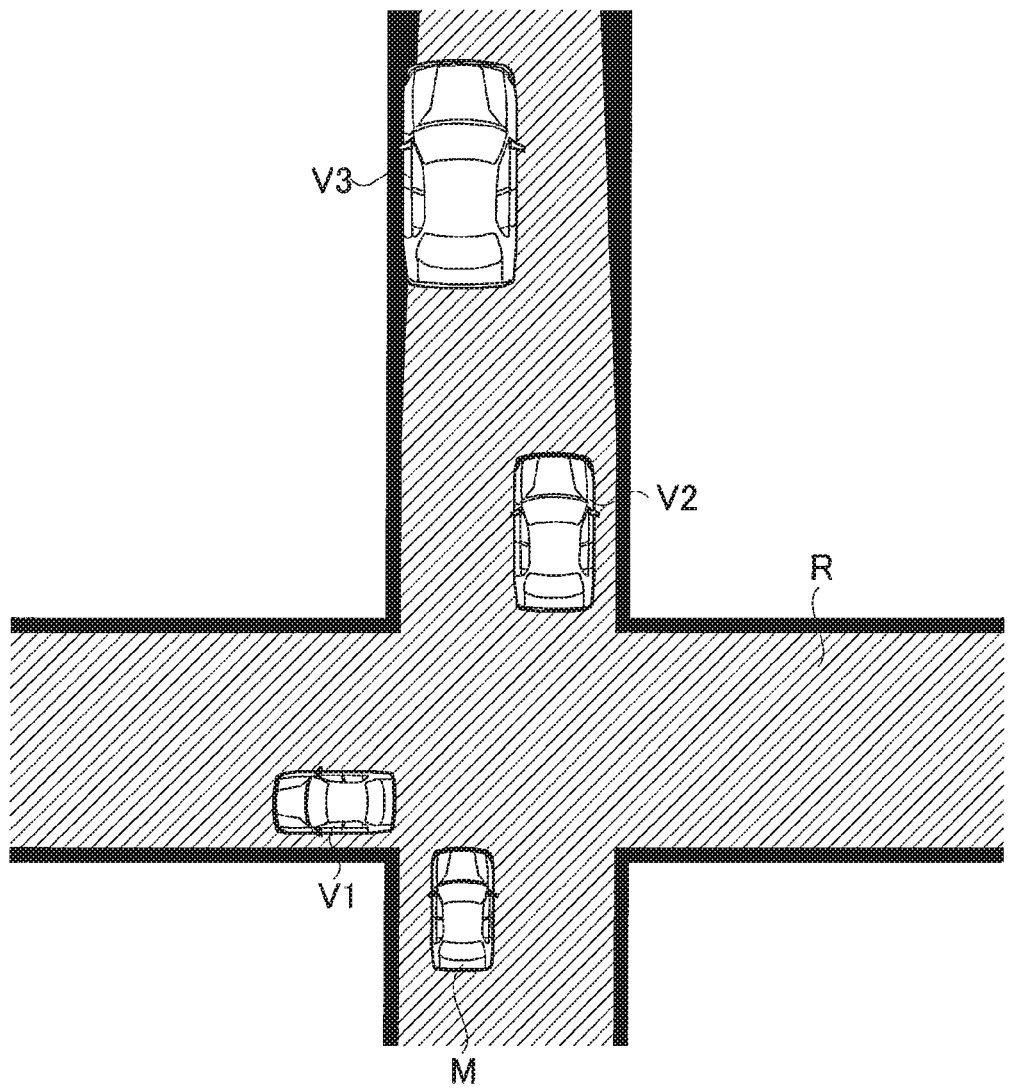
FIG. 5 is a view in which the travelable region and the vehicles are arranged on the map.

Next, a modified example 1 of the embodiment is described with reference to FIG. 5. In the modified example 1, as illustrated in FIG. 5, the mapping unit 41 increases the thickness of the boundary lines of the travelable region R as the distance from the host vehicle M increases. Moreover, the mapping unit 41 increases the size of each of the arranged other vehicles V1 to V3 as the distance from the host vehicle M increases. These operations are performed in consideration of errors (measurement errors) of the camera and the radar. Generally, the errors of the camera, the laser radar, and the like increase as the distance increases. Accordingly, an error may be included in information on the other vehicle existing far away from the host vehicle M. Thus, as illustrated in FIG. 5, the mapping unit 41 increases the thickness of the boundary lines of the travelable region R and increases the size of the other vehicle as the distance from the host vehicle M increases. The other vehicle V3 which exists far away from the host vehicle M is thus more likely to be judged to overlap the region outside the travelable region R. Note that increasing the thickness of the boundary lines of the travelable region R is, in other words, reducing the size of the travelable region R.

As described above, the vehicle periphery information verification device 1 according to the modified example 1 reduces the size of the travelable region R and increases the size of the other vehicle larger depending on the distance from the host vehicle M. The vehicle periphery information verification device 1 is thereby more likely to detect the detected periphery information including a contradiction. This prevents the vehicle periphery information verification device 1 from using the detected periphery information including a contradiction, and safe and highly-accurate autonomous driving can be thereby achieved.

Moreover, the vehicle periphery information verification device 1 according to the modified example 1 arranges the other vehicle while increasing the size thereof as the distance from the host vehicle M to the other vehicle increases. The vehicle periphery information verification device 1 is thereby more likely to detect the detected periphery information including a contradiction. This prevents the vehicle periphery information verification device 1 from using the detected periphery information including a contradiction, and safe and highly-accurate autonomous driving can be thereby achieved.

Furthermore, the vehicle periphery information verification device 1 according to the modified example 1 reduces the size of the travelable region R as the distance from the host vehicle M increases. The vehicle periphery information verification device 1 is thereby more likely to detect the detected periphery information including a contradiction. This prevents the vehicle periphery information verification device 1 from using the detected periphery information including a contradiction, and safe and highly-accurate autonomous driving can be thereby achieved.

Figure 6:
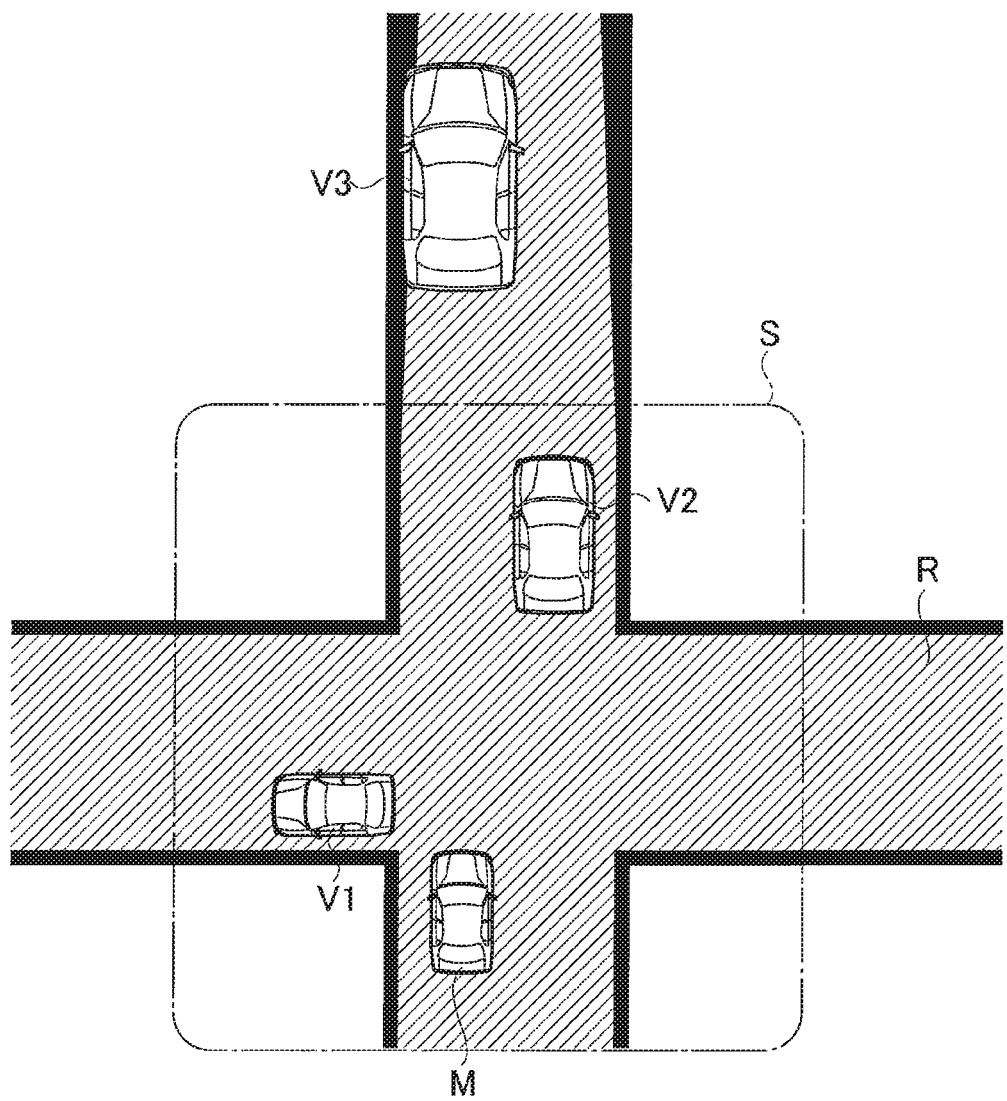
FIG. 6 is a view in which the travelable region and the vehicles are arranged on the map.

Note that the vehicle periphery information verification device 1 may be configured such that, as illustrated in FIG. 6, the mapping unit 41 sets a detection range S which is a certain distance range from the host vehicle M in consideration of the errors of the camera, the laser radar, and the like and the contradiction judgment unit 42 judges whether the other vehicles V1, V2 within the detection range S overlap the region outside the travelable region R. The contradiction judgment unit 42 can thereby judge whether the information includes a contradiction in a range in which the errors are small. Note that the detection range S can be obtained in advance through experiments and simulations based on the performances of the camera, the laser radar, and the like.

MODIFIED EXAMPLE 2

Next, a modified example 2 of the embodiment is described with reference to the flowchart of FIG. 7. In the modified example 2, the contradiction judgment unit 42 further judges whether the other vehicles are stationary. The reason for this is because there is a case where the other vehicle is driven over a curb and stopped and the information of this other vehicle includes no contradiction. This point is described below.

Figure 4:
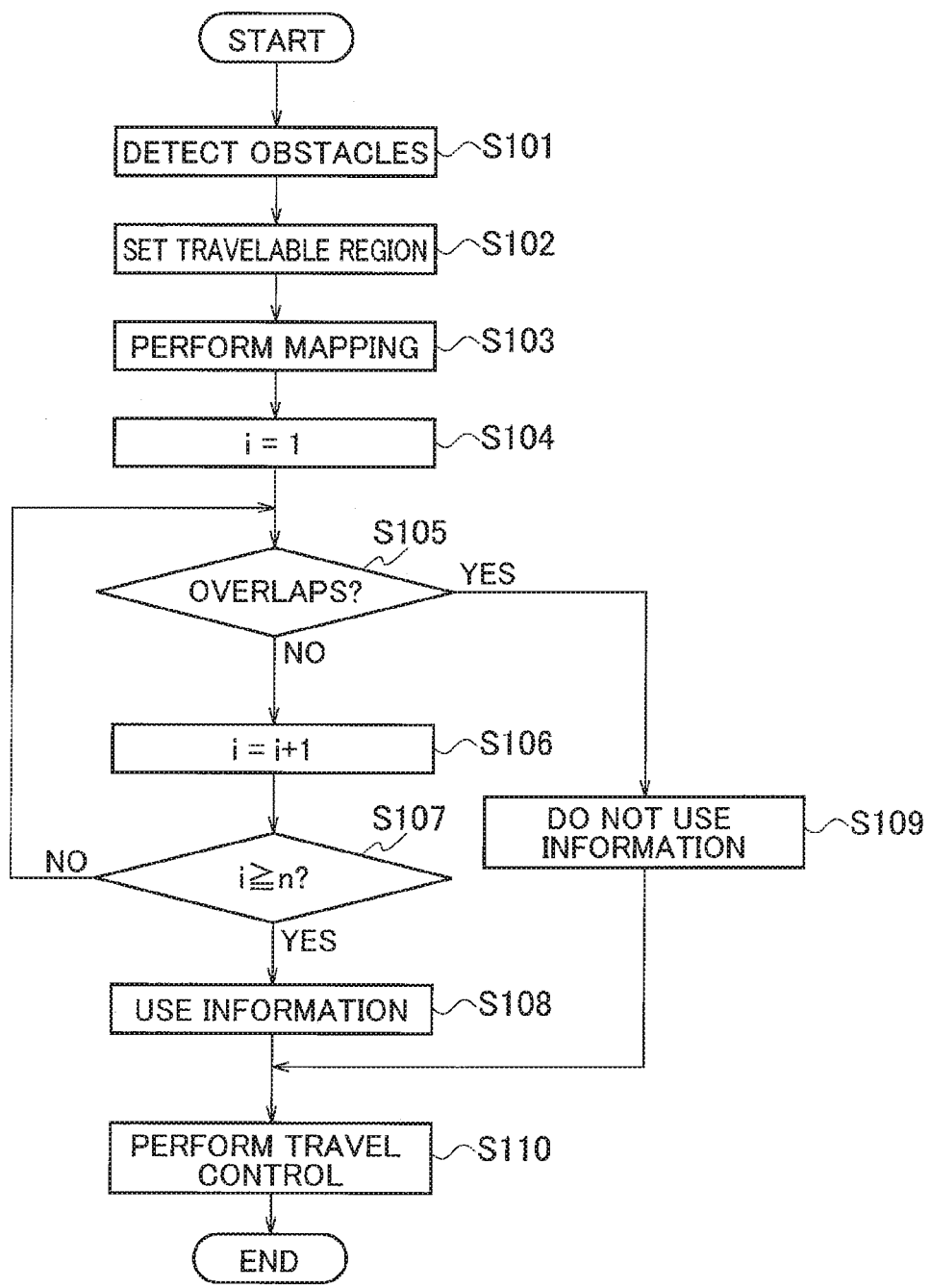
FIG. 4 is a flowchart for explaining an operation example of the vehicle periphery information verification device according to the embodiment of the present invention.
Figure 7:
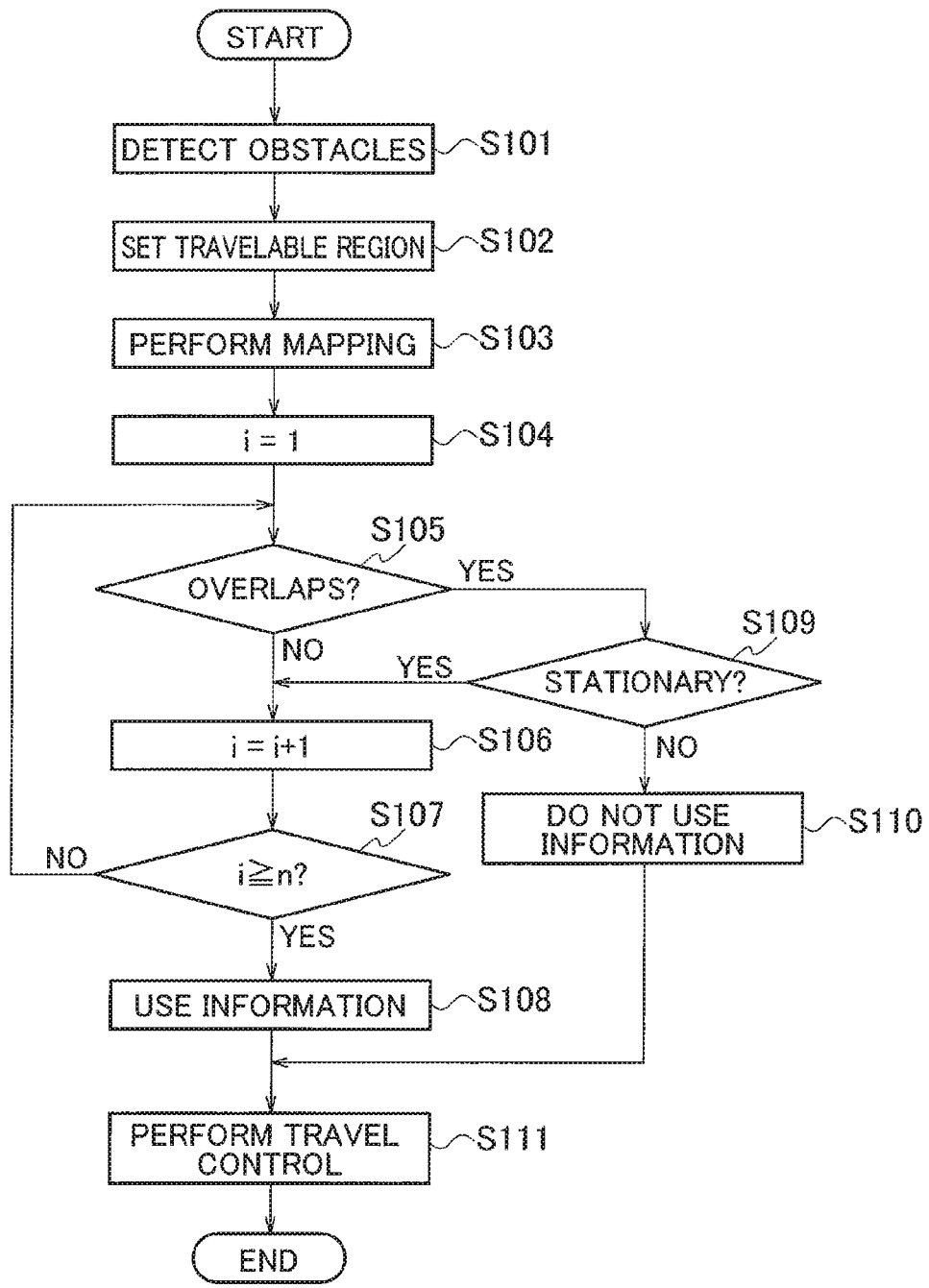
FIG. 7 is a flowchart for explaining an operation example of the vehicle periphery information verification device according to a modified example 2 of the embodiment of the present invention.

Since steps S101 to S108 and S110 to S111 depicted in FIG. 7 are the same operations as steps S101 to S108 and S109 to S110 in FIG. 4, respectively, description thereof is omitted. In this case, description is given assuming that, in step S105 depicted in FIG. 7, the contradiction judgment unit 42 judges that the other vehicle V1 overlaps the region outside the travelable region R and the processing has proceeded to step S109.

In step S109, the contradiction judgment unit 42 judges whether the other vehicle V1 is stationary or not. For example, the contradiction judgment unit 42 judges that the other vehicle V1 is stationary when the speed of the other vehicle V1 is equal to or lower than a predetermined speed (for example, 5 km/h). In this case (Yes in step S109), the processing proceeds to step S106. Specifically, this means that, although the other vehicle V1 overlaps the region outside the travelable region R, since the case where the other vehicle V1 has been driven from a shoulder over a curb and stopped is conceivable, and the contradiction judgment unit 42 judges that the information on the other vehicle V1 includes no contradiction. When the contradiction judgment unit 42 judges that the other vehicle V1 is not stationary (No in step S109), the processing proceeds to step S110. By repeating the processing of steps S105 to S107 and S109 depicted in FIG. 7, the contradiction judgment unit 42 judges whether at least one other vehicle which is not stationary and overlaps the region outside the travelable region R exists. In other words, when the other vehicle which is not stationary and overlaps the region outside the travelable region R does not exist, the contradiction judgment unit 42 judges that the other vehicles are all arranged in the travelable region R or overlap the region outside the travelable region R but is stationary.

As described above, when judging that any of the other vehicles overlaps the region outside the travelable region R, the vehicle periphery information verification device 1 according to the modified example 2 judges whether this other vehicle is stationary. Then, when the vehicle periphery information verification device 1 judges that the other vehicle is stationary and all of the other obstacles detected are arranged in the travelable region R or overlap the region outside the travelable region R but are stationary, the vehicle periphery information verification device 1 determines the action of autonomous driving by using the detected periphery information. The vehicle periphery information verification device 1 can thus achieve safe and highly-accurate autonomous driving.

Although the embodiment of the present invention has been described above, it should not be understood that the description and the drawings forming part of this disclosure limit the present invention. From this disclosure, various alternative embodiments, examples, and operations techniques will be found by those skilled in the art. For example, although the example in which the obstacle is judged to be not arranged in the travelable region R when at least part of the obstacle is arranged outside the travelable region is described in the embodiment, the present invention is not limited to this example. The obstacle may be judged to be not arranged in the travelable region R when the entire obstacle is arranged outside the travelable region R.

Moreover, in the embodiment, when at least one of the obstacles overlaps the region outside the travelable region R, the determination of the action of autonomous driving by using the detected periphery information is prohibited and the action of autonomous driving is determined without using the detected periphery information, but the present invention is not limited to this. The action of autonomous driving may be determined without using only the information on the obstacle overlapping the region outside the travelable region R. Specifically, describing with reference to FIG. 2B, the vehicle periphery information verification device may prohibit itself from determining the action of autonomous driving by using the information on the other vehicles V1, V2 and determine the action of autonomous driving by using the information on the other vehicle V3.

REFERENCE SIGNS LIST

10 map database
20 periphery information detection instrument
30 host vehicle information detection instrument
40 controller
41 mapping unit
42 contradiction judgment unit
43 action determination unit
44 prohibiting unit
45 travel control unit

The invention claimed is:
1. A vehicle periphery information verification device for a host vehicle comprising:
one or both of a camera and a radar configured to detect an obstacle, wherein to detect the obstacle comprises detecting a current position of the obstacle; and
a controller that controls autonomous travel of the host vehicle, the controller configured to:
map a travelable region on a map that is a digital map, the travelable region includes roadways and shoulders;
map the obstacle on the map by placing the obstacle on the map using the detected current position of the obstacle;
judge whether the obstacle on the map is arranged in the travelable region;
determine an action of autonomous driving of the host vehicle, wherein to determine the action of autonomous driving comprises to:
in response to the judging indicating that the obstacle is not arranged in the travelable region, determine the action of autonomous driving without using the current position of the obstacle,
wherein the controller judges that the obstacle is not arranged in the travelable region when a part of the obstacle is arranged to overlap outside the travelable region and another part of the obstacle is arranged to overlap in the travelable region, and wherein the determined action of autonomous driving is selected from a set of actions comprising maintaining a current traveling state that is determined without using the current position of the obstacle; and control of the host vehicle based on the determined action, wherein outside the travelable region is defined as outside the roadways and the shoulders.

2. The vehicle periphery information verification device according to claim 1, wherein to map the obstacle on the map by placing the obstacle on the map using the detected current position of the obstacle comprises at least one of increasing a size of the obstacle depending on a distance from the host vehicle to the obstacle or reducing a size of the travelable region depending on the distance from the host vehicle to the obstacle.

3. The vehicle periphery information verification device according to claim 2, wherein the controller maps the obstacle while increasing the size of the obstacle as a distance from the host vehicle to the obstacle increases.

4. The vehicle periphery information verification device according to claim 2, wherein the controller reduces the size of the travelable region as a distance from the host vehicle increases.

5. The vehicle periphery information verification device according to claim 1, wherein the controller is further configured to:

judge whether a speed of the obstacle is equal to or lower than a predetermined speed when judging that the obstacle is not arranged in the travelable region, and determine the action of the host vehicle by using information on the obstacle when the controller judges that the speed of the obstacle is equal to or lower than the predetermined speed.

6. The vehicle periphery information verification device according to claim 1, wherein the controller is further configured to:

calculate a first predetermined distance from a first end point to a second end point in the travelable region, a second predetermined distance which is a vehicle width of the obstacle, and a third predetermined distance from the first end point which includes the vehicle width of the obstacle; and judge that the obstacle is not arranged in the travelable region when the third predetermined distance is smaller than a sum of the first predetermined distance and the second predetermined distance.

7. The vehicle periphery information verification device according to claim 1, wherein the controller is configured to:

in response to the judging indicating that all the obstacle is not arranged in the travelable region, prohibit determining the action of the host vehicle;

in response to the judging indicating that all the obstacle is arranged in the travelable region, determine the action of the host vehicle; and in response to the judging indicating that the part of the obstacle is arranged to overlap outside the travelable region and the other part of the obstacle is arranged to overlap in the travelable region, prohibit determining the action of the host vehicle.

8. The vehicle periphery information verification device according to claim 1, wherein the set of actions further comprises a first action of stopping the host vehicle and a second action of notifying a driver of the host vehicle of the obstacle.

9. A vehicle periphery information verification method for a host vehicle comprising:

detecting an obstacle by one or both of a camera and a radar, wherein detecting the obstacle comprises detecting a current position of the obstacle;

mapping a travelable region on a map that is retrieved from memory, wherein the travelable region includes roadways and shoulders;

mapping the detected obstacle on the map by placing the obstacle on the map using the detected current position of the obstacle;

judging whether the obstacle on the map is arranged in the travelable region;

determining an action of the host vehicle by using judgement information on the obstacle arranged on the map;

in response to judging that the arranged obstacle is not arranged in the travelable region, prohibiting the determination of the action of the host vehicle by using at least the judgement information on the obstacle being not arranged in the travelable region, wherein a judgement is made that the obstacle is not arranged in the travelable region when a part of the obstacle is arranged to overlap outside the travelable region and another part of the obstacle is arranged to overlap in the travelable region, wherein the outside the travelable region is a region where the obstacle is not expected to travel, wherein the determined action is selected from a set of actions comprising a first action of stopping the host vehicle and a second action of notifying a driver of the host vehicle of the obstacle; and wherein outside the travelable region is defined as outside the roadways and the shoulders; and altering control of the host vehicle based on the determined action.

10. The method of claim 9, wherein the travelable region comprises roadways.

11. The method of claim 10, wherein the travelable region further comprises shoulders.

12. The method of claim 9, wherein the set of actions further comprises a third action of maintaining a current traveling state that is determined without using the current position of the obstacle.

* * * * *